(12) United States Patent
H R et al.

(10) Patent No.: US 12,463,938 B2
(45) Date of Patent: Nov. 4, 2025

(54) DEVICES, SYSTEMS, AND METHODS FOR INSTALLING BINDING INFORMATION AFTER FAILURES CAUSED BY TRANSIENT ERRORS

(71) Applicant: Juniper Networks, Inc., Sunnyvale, CA (US)

(72) Inventors: Jayadev H R, Bangalore (IN); Cristina Radulescu-Banu, Lexington, MA (US); John Gibbons, Ashland, MA (US); Venkatesh Padebettu, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/479,043

(22) Filed: Sep. 30, 2023

(65) Prior Publication Data
US 2025/0112888 A1 Apr. 3, 2025

(51) Int. Cl.
*H04L 61/5014* (2022.01)
*H04L 61/2553* (2022.01)
*H04L 61/5053* (2022.01)
*H04L 69/40* (2022.01)

(52) U.S. Cl.
CPC ...... *H04L 61/5014* (2022.05); *H04L 61/2553* (2013.01); *H04L 61/5053* (2022.05)

(58) Field of Classification Search
CPC ............ H04L 61/5014; H04L 61/2553; H04L 61/5053; H04L 69/40
See application file for complete search history.

(56) References Cited

U.S. PATENT DOCUMENTS

| | | | |
|---|---|---|---|
| 2011/0282998 A1* | 11/2011 | Johnsson ............ | H04L 61/5061 709/226 |
| 2013/0311991 A1* | 11/2013 | Li ........................ | H04L 61/5014 718/1 |
| 2021/0185139 A1* | 6/2021 | Wang ...................... | H04L 67/14 |
| 2024/0298315 A1* | 9/2024 | Maamari ................ | H04W 72/21 |

OTHER PUBLICATIONS

European Search Report for European Patent Application No. 23217559, date of completion of search Apr. 2, 2024; 4 pages.

* cited by examiner

*Primary Examiner* — Kamal M Hossain
(74) *Attorney, Agent, or Firm* — Greenberg Traurig, LLP (57) ABSTRACT

A disclosed apparatus may include and/or represent a first node and a second node communicatively coupled to the first node. In some examples, the second node is configured to send binding information to the first node and then resend the binding information to the first node due at least in part to not having received an acknowledgement of successful installation of the binding information from the first node. Various other devices, systems, and methods are also disclosed.

15 Claims, 10 Drawing Sheets

DEVICES, SYSTEMS, AND METHODS FOR INSTALLING BINDING INFORMATION AFTER FAILURES CAUSED BY TRANSIENT ERRORS

BACKGROUND

Network management protocols are often used for assigning Internet Protocol (IP) addresses and/or certain networking parameters to devices included in a network. For example, a network may implement a client-server architecture in which a server automatically assigns an IP address to a client via the Dynamic Host Configuration Protocol (DHCP). In this example, the IP address assigned to the client may be stored as binding information in certain locations within the network, such as the server and/or a relay device that resides between the client and the server. Occasionally, an error that prevents successful installation of such binding information may occur.

The instant disclosure, therefore, identifies and addresses a need for additional devices, systems, and methods for installing binding information after failures caused by transient errors.

SUMMARY

As will be described in greater detail below, the instant disclosure generally relates to devices, systems, and methods for installing binding information after failures caused by transient errors. In one example, a system for accomplishing such a task may include and/or represent a first node and a second node communicatively coupled to the first node. In this example, the second node may be configured to send binding information to the first node. In addition, the second node may be further configured to resend the binding information to the first node due at least in part to failing to receive an acknowledgement of successful installation of the binding information from the first node.

Similarly, a corresponding node may include and/or represent a communication interface and a processing device communicatively coupled to the communication interface. In one example, the processing device may be configured to send binding information to an additional node via the communication interface. In this example, the processing device may be further configured to resend the binding information to the additional node due at least in part to failing to receive an acknowledgement of successful installation of the binding information from the additional node.

Additionally or alternatively, a corresponding method may include and/or represent (1) sending, by a node, binding information to an additional node, (2) after having sent the binding information to the additional node, awaiting an acknowledgement of successful installation of the binding information from the additional node, and (3) resending, by the node, the binding information to the additional node due at least in part to failing to receive the acknowledgement of successful installation of the binding information from the additional node.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various devices, systems, and methods for installing binding information after failures caused by transient errors. As will be explained in greater detail below, embodiments of the instant disclosure may enable nodes that send binding messages and/or information to other nodes for installation to detect install failures caused by transient errors (e.g., network failures, system failures, configuration failures, reboots, authentication service outages, errors caused by administrators, etc.). For example, a server or relay device may send DHCP binding information to a peer node for installation and then wait for an acknowledgement (sometimes referred to as an "ACK") to confirm whether the peer node was able to successfully install the DHCP binding information. However, if the server or relay device fails to receive such an acknowledgement from the peer node after waiting for a certain amount of time, the server or relay device may resend the DHCP binding information to the peer node for installation and then wait for an acknowledgement again.

In some examples, the server or relay device may continue this sequence and/or pattern until receiving an acknowledgment confirming that the peer node was able to successfully install the DHCP binding information. In one example, the server or relay device may continue this sequence and/or pattern for a certain number of attempts before abandoning the process of installing the DHCP binding information on that peer node. Additionally or alternatively, the server or relay device may receive a negative acknowledgement (sometimes referred to as a "NACK") indicating that the peer node was unable to successfully install the DHCP binding information. In response to receiving the negative acknowledgement, the server or relay device may continue resending the DHCP binding information to the peer node until receiving an acknowledgment confirming that the peer node was able to successfully install the DHCP binding information.

In some examples, if the negative acknowledgement indicates that the reason for the install failure was a transient error or issue, then the server or relay device may continue resending the DHCP binding information indefinitely until receiving an acknowledgment. In other examples, if the negative acknowledgement indicates that the reason for the install failure was not necessarily a transient error or issue, then the server or relay device may simply abandon and/or discontinue the process of installing the DHCP binding information on that peer node.

The following will provide, with reference to FIGS. 1-8 detailed descriptions of exemplary devices, systems, components, and corresponding implementations for installing binding information after failures caused by transient errors. Detailed descriptions of computer-implemented methods for installing binding information after failures caused by transient errors will be provided in connection with FIG. 9. In addition, detailed descriptions of an exemplary computing system for carrying out these methods will be provided in connection with FIG. 10.

Figure 1:
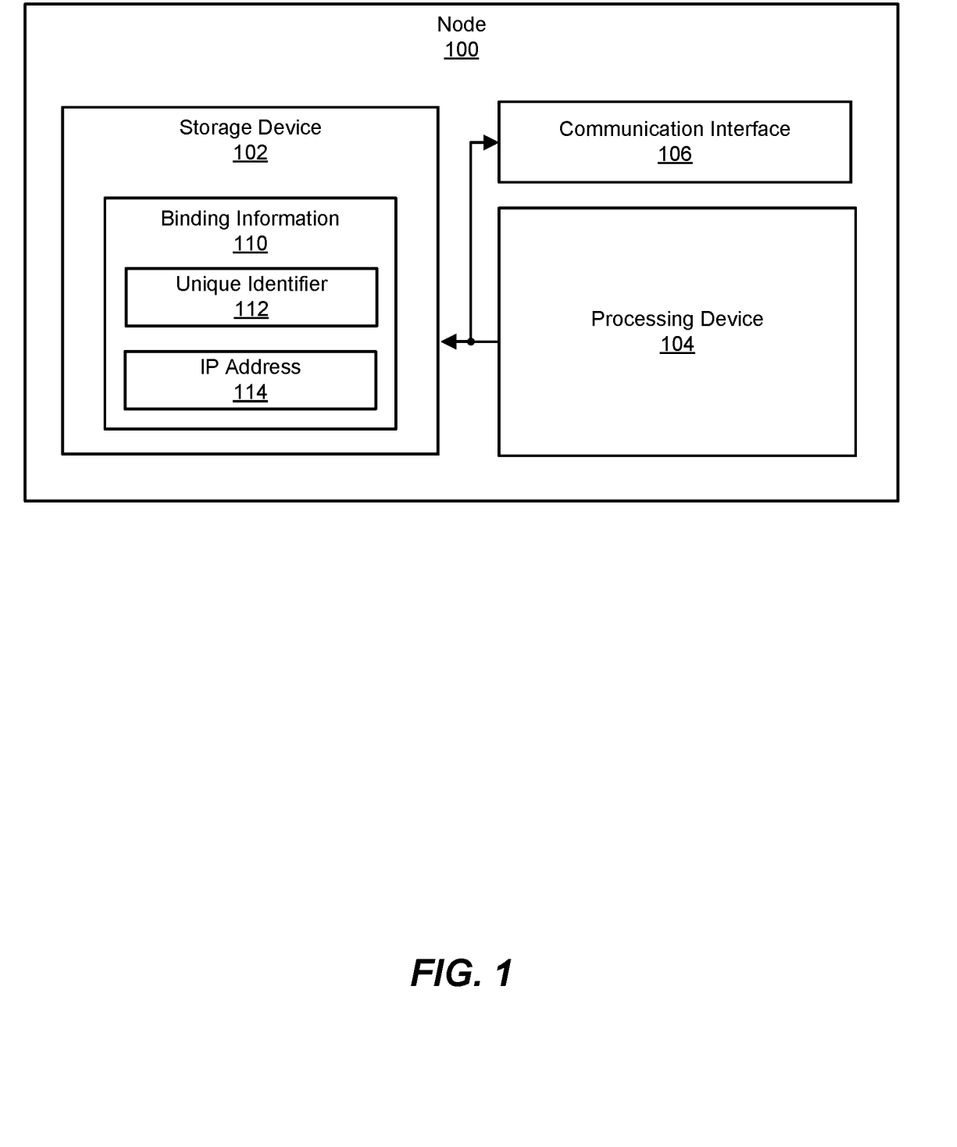
FIG. 1 is a block diagram of an exemplary node capable of facilitating the installation of binding information after failures caused by transient errors according to one or more embodiments of this disclosure.

FIG. 1 illustrates an exemplary node 100 for installing binding information after failures caused by transient errors. In some examples, node 100 may constitute and/or represent a computing device and/or apparatus capable of facilitating the installation of binding information after failures caused by transient errors. As illustrated in FIG. 1, exemplary node 100 may include and/or represent a storage device 102, a processing device 104, and/or a communication interface 106.

In some examples, storage device 102 may store and/or maintain binding information 110 that maps a unique identifier 112 of a client device (e.g., a subscriber) and/or an IP address assigned to the client device. In one example, binding information 110 may be formatted in and/or applicable to the DHCP implemented by a network that includes node 100. In this example, unique identifier 112 may include and/or represent a media access control (MAC) address of the client device. Additionally or alternative, unique identifier 112 may include and/or represent another client-specific identifier of the client device.

In some examples, node 100 may include and/or represent one or more hardware, firmware, and/or software components or features that are not necessarily illustrated and/or labeled in FIG. 1. For example, node 100 may also include and/or represent communication ports, buses, additional analog and/or digital circuitry, onboard logic, radio-frequency (RF) transmitters, RF receivers, transceivers, antennas, transistors, resistors, capacitors, diodes, inductors, switches, registers, flipflops, connections, traces, buses, semiconductor (e.g., silicon) devices and/or structures, additional processing devices, additional storage devices, circuit boards, sensors, packages, substrates, housings, combinations or variations of one or more of the same, and/or any other suitable components or features that facilitate and/or support installing binding information after failures caused by transient errors.

In some examples, node 100 may include and/or represent one or more firmware and/or software modules for performing one or more tasks in connection installing binding information after failures caused by transient errors. In one example, one or more of these modules may include and/or represent one or more software applications or programs that, when executed by processing device 104, cause and/or direct processing device 104 to perform one or more tasks. Additionally or alternatively, one or more of these modules may also include and/or represent some or all of an executable file, a code snippet, and/or a computer-readable instruction used to program and/or configure processing device 104. Examples of nodes 100 and 210 include, without limitation, relay devices, servers, gateways (e.g., Border Network Gateways (BNGs)), client devices, combinations or variations of one or more of the same, and/or any other suitable nodes.

In some examples, storage device 102 may include and/or represent any type or form of volatile or non-volatile memory device, medium, and/or system capable of storing data and/or computer-readable instructions. In one example, storage device 102 may store, load, and/or maintain binding information 110, which includes and/or identifies a mapping of unique identifier 112 to IP address 114. Although illustrated as a single unit in FIG. 1, storage device 102 may alternatively include and/or represent a distributed storage system consisting of multiple memory units. Examples of storage device 102 include, without limitation, random access memory (RAM), read only memory (ROM), flash memory, hard disk drives, (HDDs), solid-state drives (SSDs), optical disk drives, caches, variations or combinations of one or more of the same, and/or any other suitable storage memory devices.

In some examples, processing device 104 may include and/or represent any type or form of hardware-implemented processing unit capable of interpreting and/or executing computer-readable instructions. Processing device 104 may direct and/or cause node 100 to perform and/or execute any of the various activities, processes, and/or actions described herein in connection with node 100. In one example, processing device 104 may access and/or modify binding information 110 in storage device 102. In another example, processing device 104 may install binding information 110 in a DHCP lease database. Additionally or alternatively, processing device 104 may send and/or transmit binding information 110 to a relay device, a server, the client device itself, and/or a peer node for installation in a lease information database.

Although illustrated as a single unit in FIG. 1, processing device 104 may include and/or represent a collection of multiple processing units that work and/or operate in conjunction with one another. Examples of processing device 104 include, without limitation, microprocessors, microcontrollers, central processing units (CPUs), field-programmable gate arrays (FPGAs), application-specific integrated circuits (ASICs), systems on chips (SoCs), parallel accelerated processors, tensor cores, integrated circuits, chiplets, portions of one or more of the same, variations or combinations of one or more of the same, and/or any other suitable processing devices.

In some examples, communication interface 106 may constitute and/or represent a hardware component and/or circuitry incorporated into node 100. In one example, communication interface 106 may forward, send, and/or transmit traffic and/or binding information 110 to a remote device (e.g., a relay device, a server, a client device, and/or a peer node) via a direct or indirect link. In this example, communication interface 106 may include and/or represent a transceiver, a transmitter, and/or a receiver. Additional examples of interface 106 include, without limitation, communication ports, optical modules, physical interface cards (PICs), flexible PIC concentrators (FPCs), switch interface boards (SIBs), control boards, connector interface panels, egress interfaces, ingress interfaces, portions of one or more of the same, combinations or variations of one or more of the same, and/or any other suitable interface.

Figure 2:
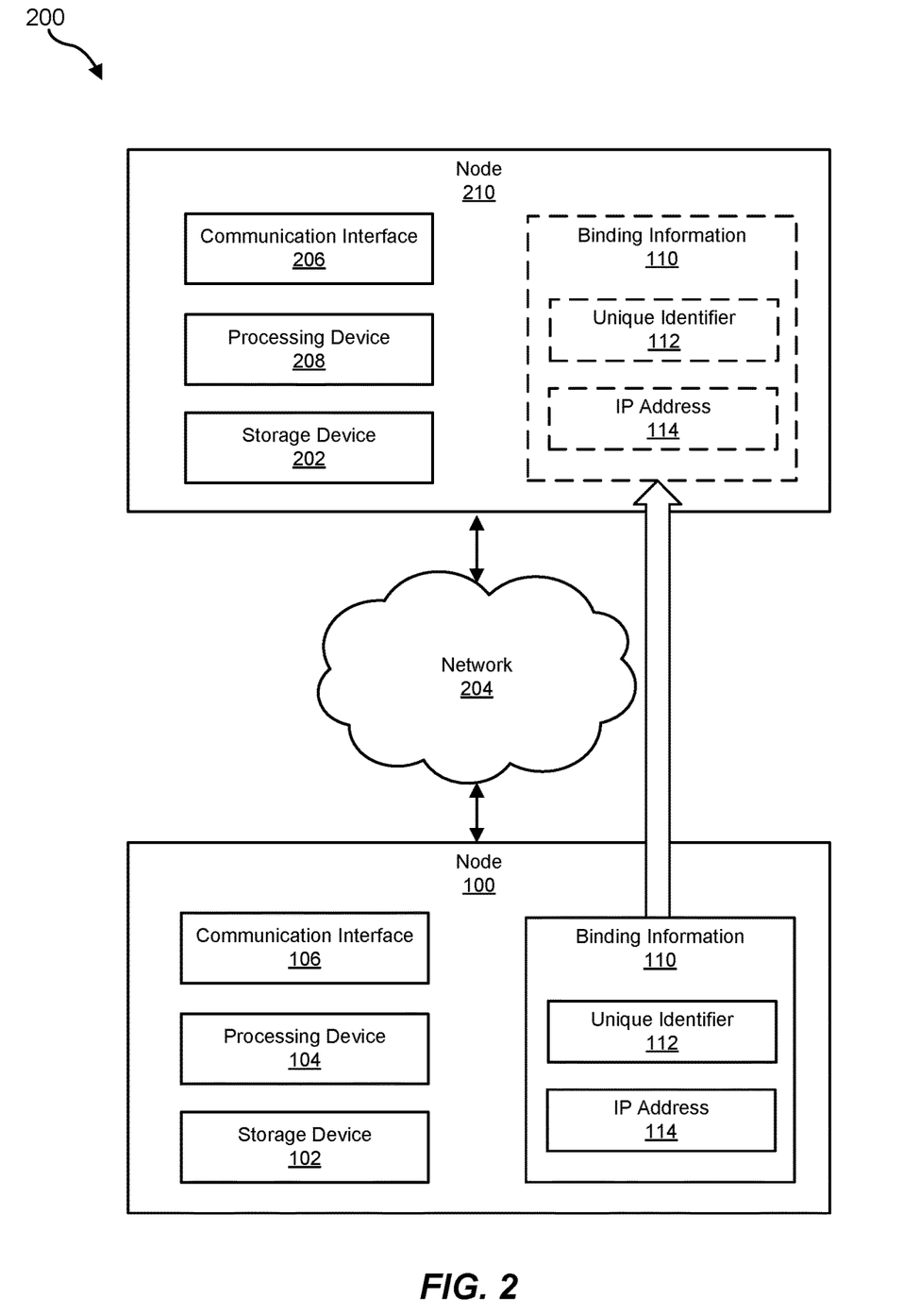
FIG. 2 is a block diagram of an exemplary system for installing binding information after failures caused by transient errors according to one or more embodiments of this disclosure.

Exemplary node 100 in FIG. 1 may be implemented in a variety of ways. For example, all or a portion of exemplary node 100 may include and/or represent portions of an exemplary system 200 in FIG. 2. As illustrated in FIG. 2, exemplary system 200 may include and/or represent node 100 and node 210 communicatively coupled to one another via a network 204. Although illustrated as being external to network 204 in FIG. 2, node 100 and/or node 210 may alternatively represent portions of network 204 and/or be included in network 204. In some examples, system 200 may include and/or represent certain devices, components, and/or features that perform and/or provide functionalities that are similar and/or identical to those described above in connection with FIG. 1.

In some examples, node 210 may include and/or represent a server and/or a relay device, and node 100 may include and/or represent a server and/or a relay device. Such a server may include and/or represent any type or form of computing device capable of assigning, maintaining, providing, and/or distributing binding information 110. In one example, the server may include and/or represent a DHCP server that assigns IP addresses to client devices within a network. Additional examples of the server include, without limitation, security servers, network servers, application servers, storage servers, and/or database servers configured to run certain software applications and/or provide various security, network, storage, and/or database services. Although illustrated as single entities in FIG. 2, nodes 100 and 210 may each include and/or represent a plurality of devices that work and/or operate in conjunction with one another.

In some examples, network 204 may include and/or represent any medium and/or architecture capable of facilitating device-to-device communication, data transfer, and/or topology mapping. In one example, network 204 may facilitate and/or support communications between node 100 and node 210. In this example, network 204 may include other devices that are not necessarily illustrated and/or labelled in FIG. 2. Accordingly, network 204 may facilitate and/or support direct and/or indirection connections between nodes 100 and 210. Network 204 may facilitate communication or data transfer using wireless and/or wired connections. Examples of network 204 include, without limitation, an intranet, an access network, a layer 2 network, a layer 3 network, an multiprotocol label switching (MPLS) network, an Internet protocol (IP) network, a heterogeneous network (e.g., layer 2, layer 3, IP, and/or MPLS) network, a wide area network (WAN), a local area network (LAN), a personal area network (PAN), the Internet, power line communications (PLC), a cellular network, portions of one or more of the same, variations or combinations of one or more of the same, and/or any other suitable network.

In some examples, node 210 may include and/or represent a storage device 202, a processing device 208, and/or a communication interface 206. In such examples, these devices may include and/or represent any of those described above in connection with node 100 in FIG. 1. In one example, processing device 208 may direct and/or cause node 210 to perform and/or execute any of the various activities, processes, and/or actions described herein in connection with node 210.

In some examples, node 210 may send, transmit, and/or provide a copy of binding information 110 to node 100 via network 204. In other examples, node 100 may send, transmit, and/or provide a copy of binding information 110 to node 210 via network 204. In one example, the need to send, transmit, and/or provide such a copy of binding information 110 to node 100 and/or node 210 may arise from node 100 and/or node 210 being rebooted and/or replaced. In another example, a relay agent may detect a deficiency and/or incompleteness in the lease database implemented on a relay device. In this example, the relay agent may then initiate and/or start the process of requesting certain missing and/or corrupted binding information from the corresponding DHCP server.

In one example, node 210 may send a lease query corresponding to binding information 110 to node 100 via network 204. In this example, node 100 may receive the lease query from node 210 and then send binding information 110 to node 210 via network 204 in response to the lease query. In certain implementations, the lease query may include and/or represent an individual lease query specific to binding information 110 and/or a bulk lease query that applies and/or corresponds to numerous DHCP bindings (such as binding information 110 and others).

In some examples, if node 210 receives binding information 110 from node 100, node 210 may attempt to install binding information 110 into a corresponding lease database. In one example, if node 210 is able to successfully install binding information 110, node 210 may send an acknowledgement of successful installation of binding information 110 to node 100 via network 204. In this example, if node 100 receives the acknowledgement of successful installation of binding information 110 from node 210 within a certain amount of time, node 100 may determine and/or confirm that node 210 was able to successfully install binding information 110 into the corresponding lease database.

However, if node 210 fails to receive binding information 110 from node 100 and/or is unable to successfully install binding information 110 into the corresponding lease database, node 210 may refuse and/or fail to send an acknowledgement of successful installation of binding information 110 to node 100 via network 204. In one example, if node 100 fails to receive an acknowledgement of successful installation of binding information 110 from node 210 within a certain amount of time, node 100 may determine and/or assume that node 210 was unable to successfully install binding information 110 into the corresponding lease database. As a result of this failure to receive such an acknowledgement from node 210, node 100 may resend binding information 110 to node 210 in an effort to give node 210 another opportunity to successfully install binding information 110 into the corresponding lease database.

In some examples, if node 210 is able to successfully install binding information 110 after the resend, node 210 may send an acknowledgement of successful installation of binding information 110 to node 100 via network 204. In this example, if node 100 receives the acknowledgement of successful installation of binding information 110 from node 210 within a certain amount of time after the resend, node 100 may determine and/or confirm that node 210 was able to successfully install binding information 110 into the corresponding lease database based at least in part on the resend.

In some examples, if node 210 is unable to successfully install binding information 110, node 210 may send a negative acknowledgement of the unsuccessful installation of binding information 110 to node 100 via network 204. Such a negative acknowledgement may indicate, signify, and/or mean that node 210 was unable to successfully install binding information 110 into the corresponding lease database. In other words, such a negative acknowledgement may indicate, signify, and/or mean that the node's attempt to install binding information 110 failed. In one example, if node 100 receives the negative acknowledgement of the unsuccessful installation of binding information 110 from node 210, node 100 may determine and/or confirm that node 210 was unable to successfully install binding information 110 into the corresponding lease database. As a result of receiving this negative acknowledgement from node 210, node 100 may resend binding information 110 to node 210 in an effort to give node 210 another opportunity to successfully install binding information 110 into the corresponding lease database.

In some examples, the negative acknowledgment may include and/or contain data, descriptions, and/or details indicating the reason that node 210 failed to successfully install binding information 110 in the corresponding lease database. In one example, the reason may indicate and/or suggest that the installation of binding information 110 resulted from a transient and/or temporary error or issue. In this example, if the reason for the install failure is a transient error or issue, node 100 may resend binding information 110 to node 210 in an effort to give node 210 another opportunity to successfully install binding information 110 into the corresponding lease database.

However, if the reason for the install failure is a permanent and/or unrecoverable error or issue (e.g., not a transient error or issue), node 100 may refuse to resend binding information 110 to node 210 and thus abandon the install process. Examples of transient errors or issues capable of preventing successful installs of binding information include, without limitation, network failures, system failures, configuration failures, reboots (e.g., restarting an FPC), authentication service outages (e.g., a Remote Authentication Dial-In User Service (RADIUS) outage), errors (e.g., a configuration error) caused by administrators, combinations or variations of one or more of the same, and/or any other errors or issues that temporarily prevent binding installs.

Figure 3:
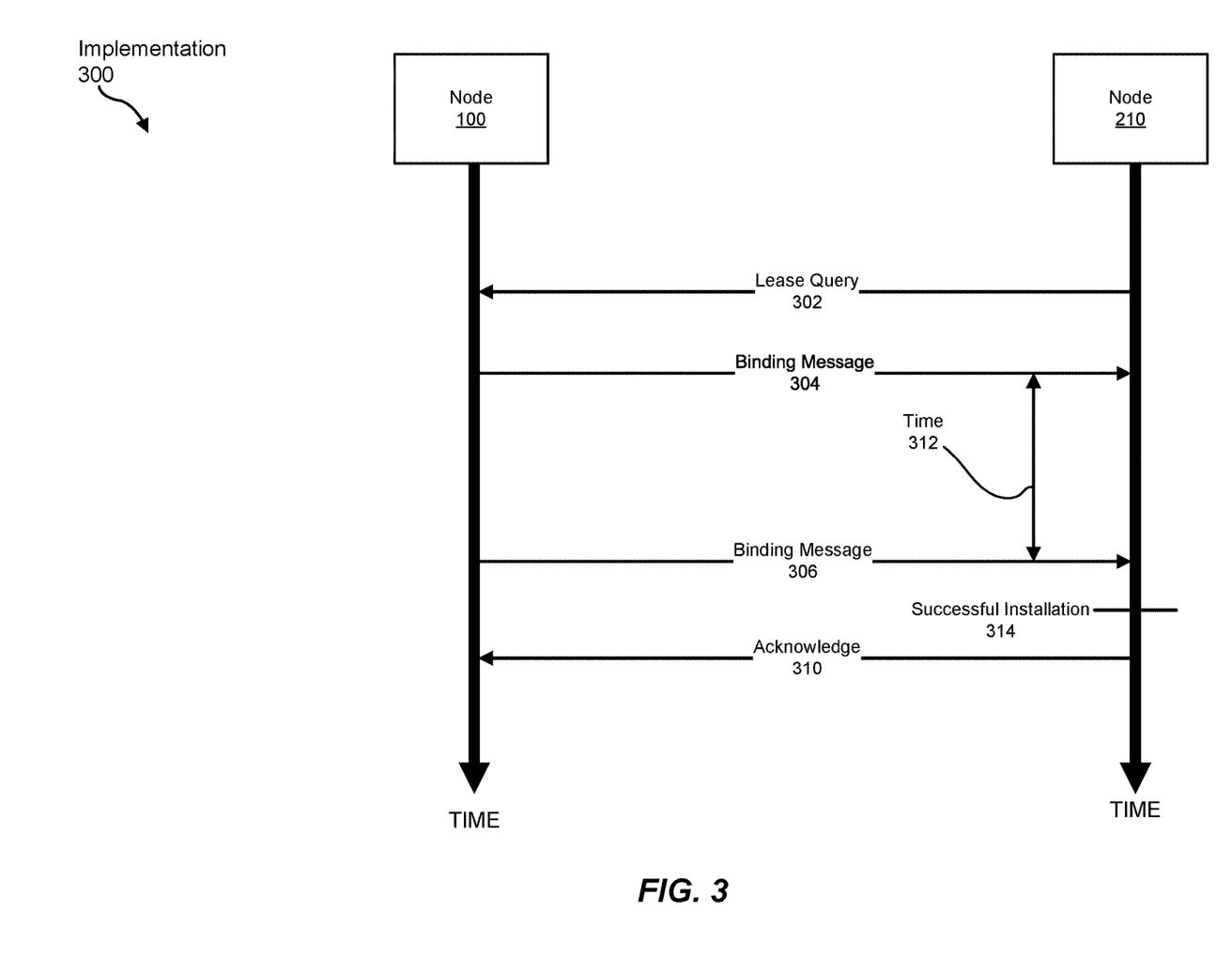
FIG. 3 is an illustration of an exemplary implementation of nodes capable of installing binding information after failures caused by transient errors according to one or more embodiments of this disclosure.

FIG. 3 illustrates an exemplary implementation 300 in which node 210 is able to successfully install binding information after a failure caused by a transient error. In some examples, implementation 300 may include and/or represent certain devices, components, and/or features that perform and/or provide functionalities that are similar and/or identical to those described above in connection with either FIG. 1 or FIG. 2. In one example, implementation 300 may involve node 210 sending a lease query 302 to node 100. In this example, implementation 300 may involve node 100 sending a binding message 304 to node 210 in response to having received lease query 302. Binding message 304 may include and/or represent binding information 110, which identifies a mapping of unique identifier 112 and IP address 114.

In some examples, after sending binding message 304, node 100 may await an acknowledgement of successful installation of binding information 110 from node 210. In one example, while awaiting such an acknowledgment, node 100 may detect the expiration of a timer that measures the amount of time that has passed since having sent binding message 304 to node 210. In this example, node 100 may resend binding information 110 to node 210 in response to detecting the expiration of the timer. For example, node 100 may send a binding message 306, which includes binding information 110, to node 210 in response to time 312 having elapsed since the sending of binding message 304. In other words, time 312 may have elapsed without node 100 having received the expected acknowledgement from node 210.

In some examples, node 210 may perform a successful installation 314 of binding information 110 into a lease database after having received binding message 306 from node 100. In response to successful installation 314, node 210 may send an acknowledge 310 to node 100. In this example, acknowledge 310 may notify node 100 that node 210 was able to successfully install binding information 110 into the lease database.

Figure 4:
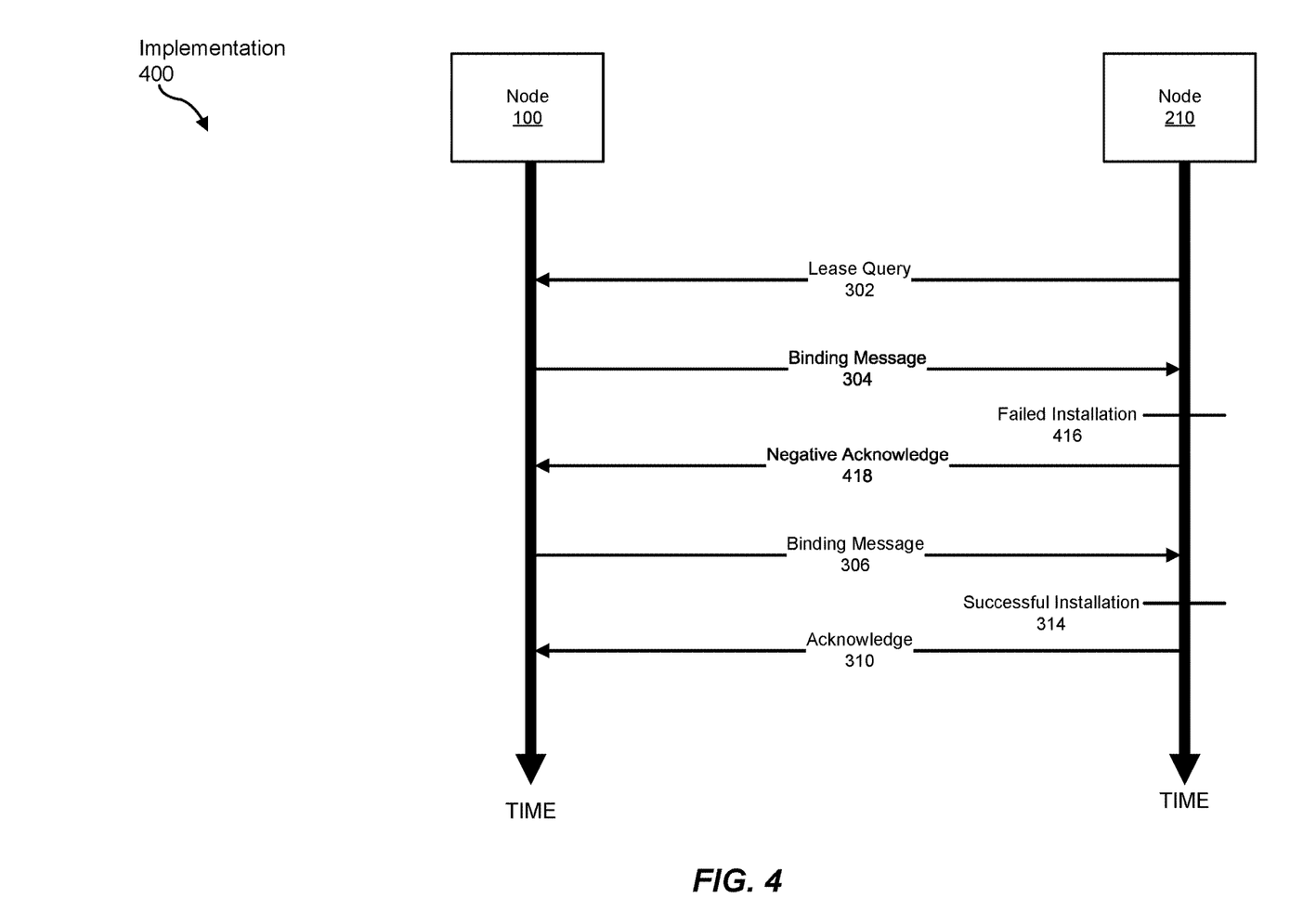
FIG. 4 is an illustration of an exemplary implementation of nodes capable of installing binding information after failures caused by transient errors according to one or more embodiments of this disclosure.

FIG. 4 illustrates an exemplary implementation 400 in which node 210 is able to successfully install binding information after a failure caused by a transient error. In some examples, implementation 400 may include and/or represent certain devices, components, and/or features that perform and/or provide functionalities that are similar and/or identical to those described above in connection with any of FIGS. 1-3. In one example, implementation 400 may involve node 210 sending lease query 302 to node 100. In this example, implementation 400 may involve node 100 sending binding message 304 to node 210 in response to having received lease query 302.

In some examples, after sending binding message 304, node 100 may await an acknowledgement of successful installation of binding information 110 from node 210. In one example, node 210 may experience failed installation 416 of binding information 110 after having received binding message 304 from node 100. In this example, as a result of failed installation 416, node 210 may send a negative acknowledge 418 to node 100. Negative acknowledge 418 may notify node 100 that node 210 was unable to successfully install binding information 110 into the lease database.

In some examples, node 100 may resend binding information 110 to node 210 in response to receiving negative acknowledge 418. In one example, node 210 may perform successful installation 314 of binding information 110 into a lease database after having received binding message 306 from node 100. In response to successful installation 314, node 210 may send acknowledge 310 to node 100. In this example, acknowledge 310 may notify node 100 that node 210 was able to successfully install binding information 110 into the lease database.

Figure 5:
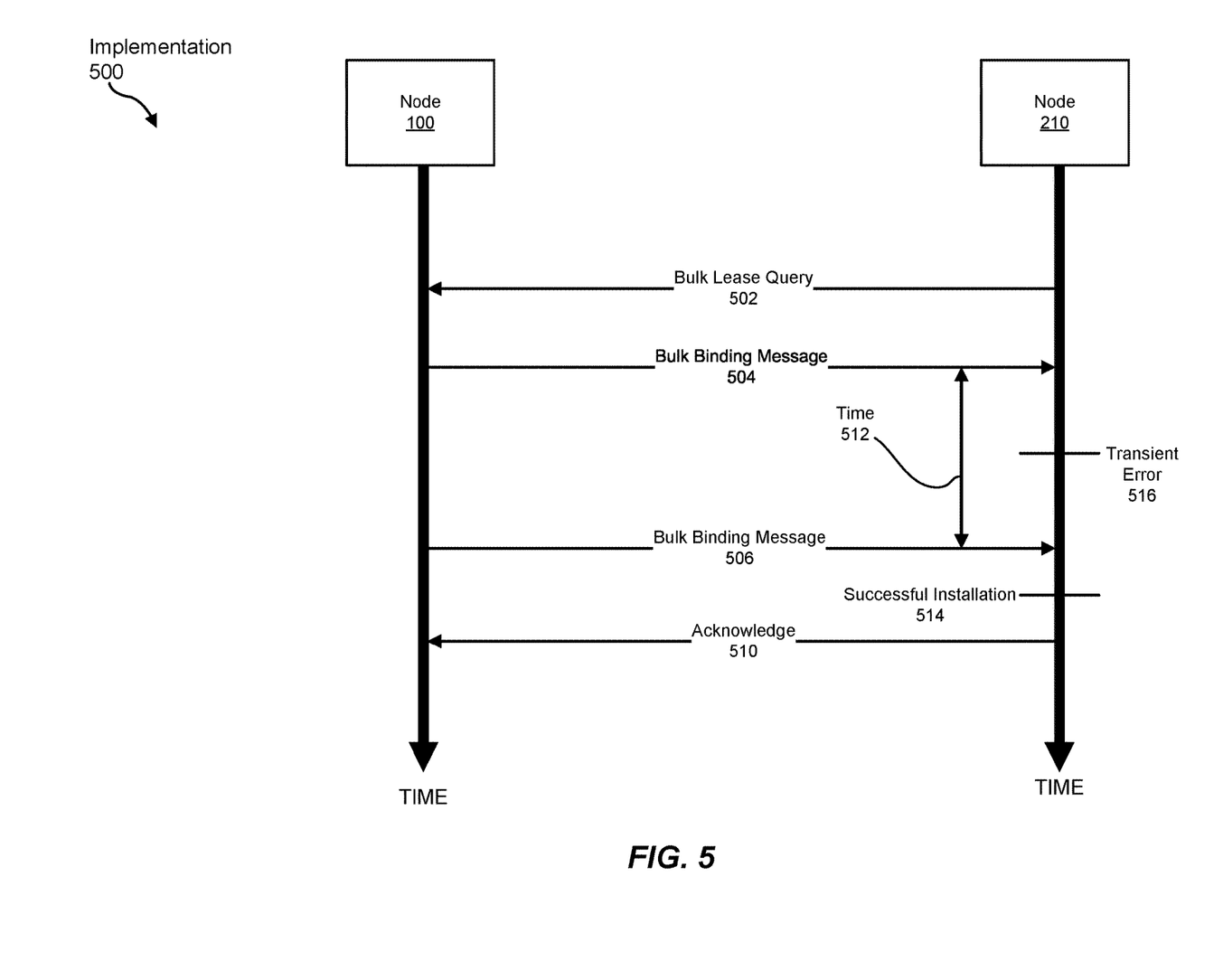
FIG. 5 is an illustration of an exemplary implementation of nodes capable of installing binding information after failures caused by transient errors according to one or more embodiments of this disclosure.

FIG. 5 illustrates an exemplary implementation 500 in which node 210 is able to successfully install binding information after a failure caused by a transient error. In some examples, implementation 500 may include and/or represent certain devices, components, and/or features that perform and/or provide functionalities that are similar and/or identical to those described above in connection with any of FIGS. 1-4. In one example, implementation 500 may involve node 210 sending a bulk lease query 502 to node 100. In this example, implementation 500 may involve node 100 sending a bulk binding message 504 to node 210 in response to having received bulk lease query 502. Bulk binding message 504 may include and/or represent various DHCP bindings (e.g., binding information 110 and others). Additionally or alternatively, bulk binding message 504 may include and/or represent some or all of the DHCP bindings installed in a lease database on node 100.

In some examples, after sending bulk binding message 504, node 100 may await an acknowledgement of successful installation of the various DHCP bindings from node 210. In one example, while node 100 awaits such an acknowledgment, node 210 and/or the corresponding network may experience a transient error 516 that prevents the successful installation of the various DHCP bindings included in bulk binding message 504. Additionally or alternatively, while awaiting such an acknowledgment, node 100 may detect the expiration of a timer that measures the amount of time that has passed since having sent bulk binding message 504 to node 210.

In some examples, node 100 may resend binding information 110 to node 210 in response to detecting the expiration of the timer. For example, node 100 may send a bulk binding message 506, which includes the same DHCP bindings as bulk binding message 504, to node 210 in response to a time 512 having elapsed since the sending of binding message 504. In other words, time 512 may have elapsed without node 100 having received the expected acknowledgement from node 210.

In some examples, node 210 may perform a successful installation 514 of binding information 110 and the other DHCP bindings into a lease database after having received binding message 506 from node 100. In response to successful installation 514, node 210 may send an acknowledge 510 to node 100. In this example, acknowledge 510 may notify node 100 that node 210 was able to successfully install the various DHCP bindings included in binding message 506 into the lease database.

Figure 6:
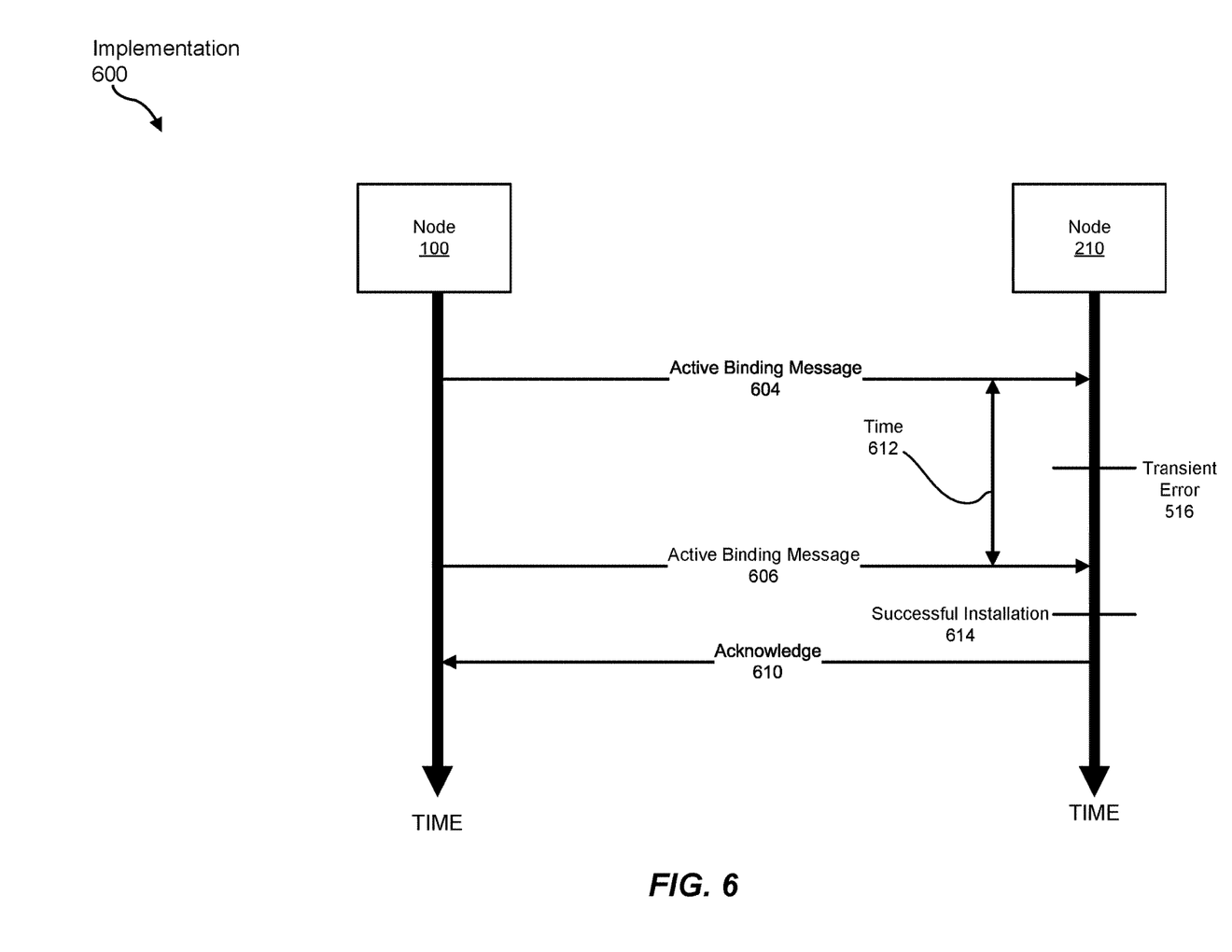
FIG. 6 is an illustration of an exemplary implementation of nodes capable of installing binding information after failures caused by transient errors according to one or more embodiments of this disclosure.

FIG. 6 illustrates an exemplary implementation 600 in which node 210 is able to successfully install binding information after a failure caused by a transient error. In some examples, implementation 600 may include and/or represent certain devices, components, and/or features that perform and/or provide functionalities that are similar and/or identical to those described above in connection with any of FIGS. 1-5. In one example, implementation 600 may involve node 100 sending an active binding message 604 to node 210 proactively and/or without receiving a corresponding lease query. Active binding message 604 may include and/or represent one or more DHCP bindings (e.g., binding information 110 and/or others).

In some examples, after sending active binding message 604, node 100 may await an acknowledgement of successful installation of the corresponding DHCP binding(s) from node 210. In one example, while node 100 awaits such an acknowledgment, node 210 and/or the corresponding network may experience transient error 516 that prevents the successful installation of the DHCP binding(s) included in active binding message 604. Additionally or alternatively, while awaiting such an acknowledgment, node 100 may detect the expiration of a timer that measures the amount of time that has passed since having sent active binding message 604 to node 210.

In some examples, node 100 may resend the binding information to node 210 in response to detecting the expiration of the timer. For example, node 100 may send an active binding message 606, which includes the same DHCP binding(s) as active binding message 604, to node 210 in response to a time 612 having elapsed since the sending of active binding message 604. In other words, time 612 may have elapsed without node 100 having received the expected acknowledgement from node 210.

In some examples, node 210 may perform a successful installation 614 of the DHCP binding(s) into a lease database after having received active binding message 606 from node 100. In response to successful installation 614, node 210 may send an acknowledge 610 to node 100. In this example, acknowledge 610 may notify node 100 that node 210 was able to successfully install the DHCP binding(s) included in active binding message 606 into the lease database.

Figure 7:
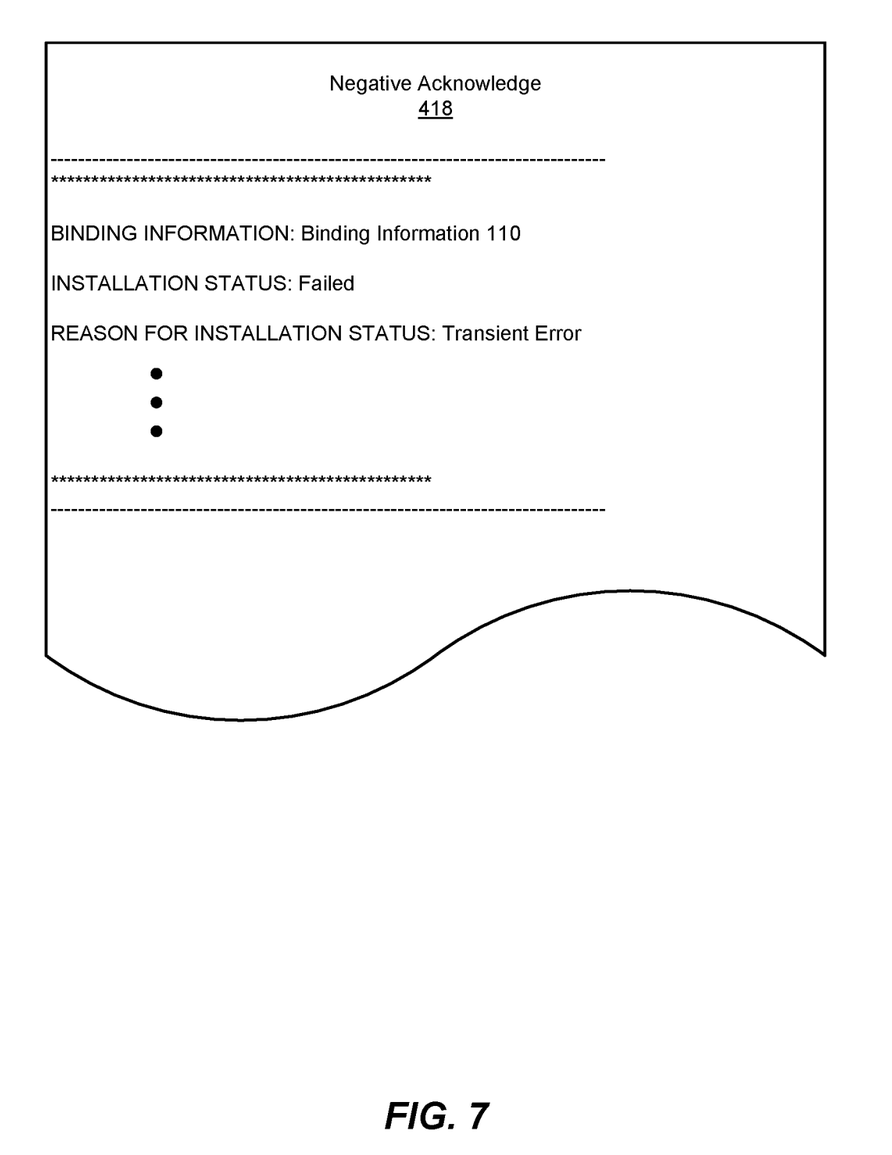
FIG. 7 is an illustration of an exemplary negative acknowledgement according to one or more embodiments of this disclosure.

FIG. 7 illustrates an exemplary implementation of negative acknowledge 418 that identifies certain data and/or features corresponding to the attempted installation of binding information 110 on node 210. In some examples, negative acknowledge 418 may include and/or represent certain data and/or features that are similar and/or identical to those described above in connection with any of FIGS. 1-6. In one example, negative acknowledge 418 may include and/or represent data that identifies and/or indicates binding information (e.g., binding information 110) that node 210 attempted to install into a lease database, the status of the installation attempt (e.g., failed), and/or the reason for the installation status (e.g., transient error). Examples of transient errors that may be represented in negative acknowledge 418 include, without limitation, network failures, system failures, configuration failures, reboots (e.g., restarting an FPC), authentication service outages (e.g., a Remote Authentication Dial-In User Service (RADIUS) outage), errors (e.g., a configuration error) caused by administrators, combinations or variations of one or more of the same, and/or any other transient errors.

Figure 8:
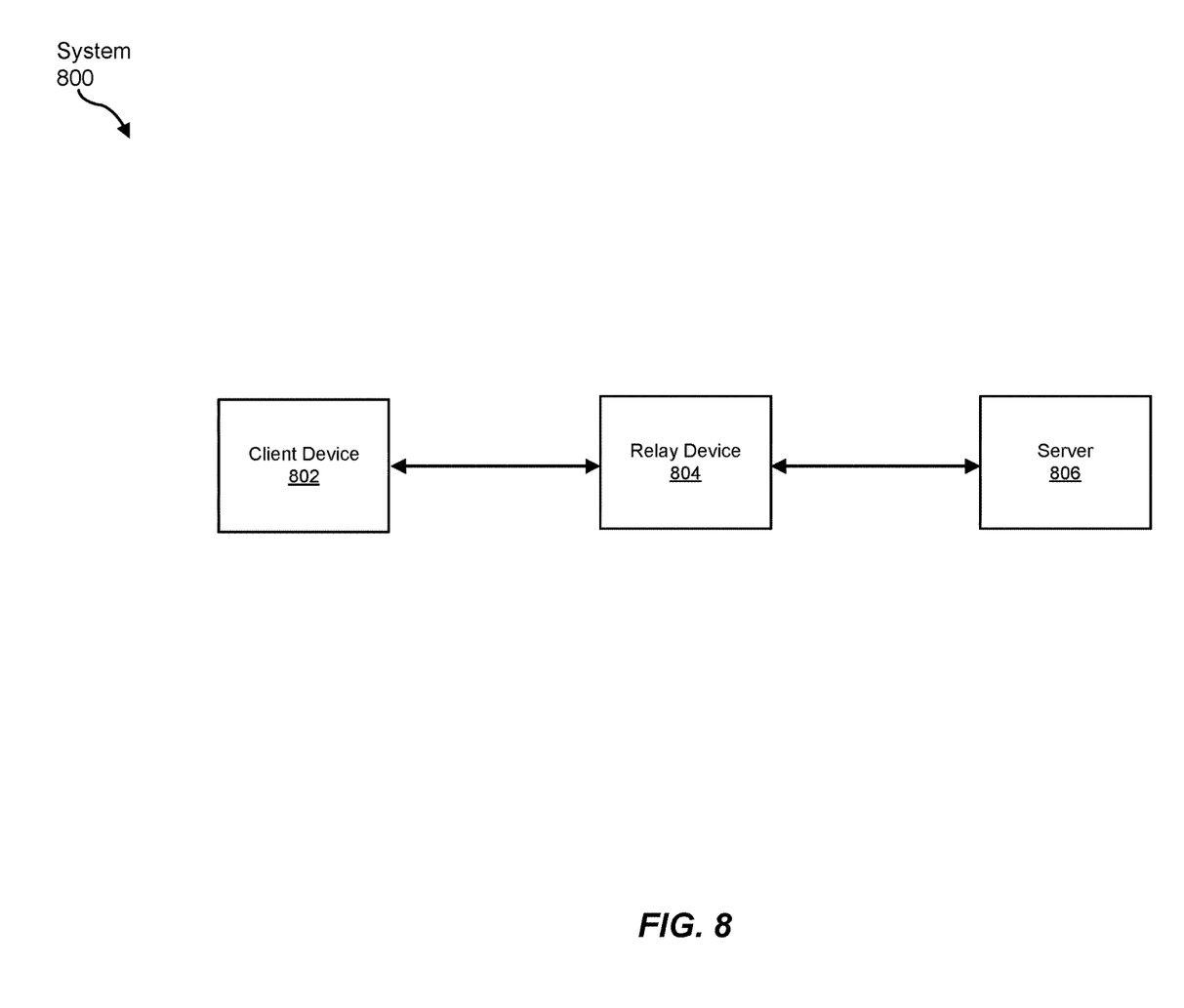
FIG. 8 is an illustration of an exemplary system for installing binding information after failures caused by transient errors according to one or more embodiments of this disclosure.

FIG. 8 illustrates an exemplary system 800 that includes and/or represents a client device 802, a relay device 804, and/or a server 806. In some examples, system 800 may include and/or represent certain devices, components, and/or features that perform and/or provide functionalities that are similar and/or identical to those described above in connection with any of FIGS. 1-7. In one example, system 800 may constitute and/or represent a specific implementation of the devices included system 200. For example, relay device 804 may communicatively couple client device 802 and server 806 to one another.

In another example, although not necessarily illustrated in this way in FIG. 8, client device 802 and server 806 may be communicatively coupled to one another via multiple relay devices and/or parallel relay devices. In a further example, although not necessarily illustrated in this way in FIG. 8, relay device 804 may communicatively couple client device 802 to multiple servers. Additionally or alternatively, although not necessarily illustrated in this way in FIG. 8, a different topology may be implemented by configuring five BNGs into a group such that each BNG in the group is directly coupled and/or connected to every other BNG in the group.

Figure 9:
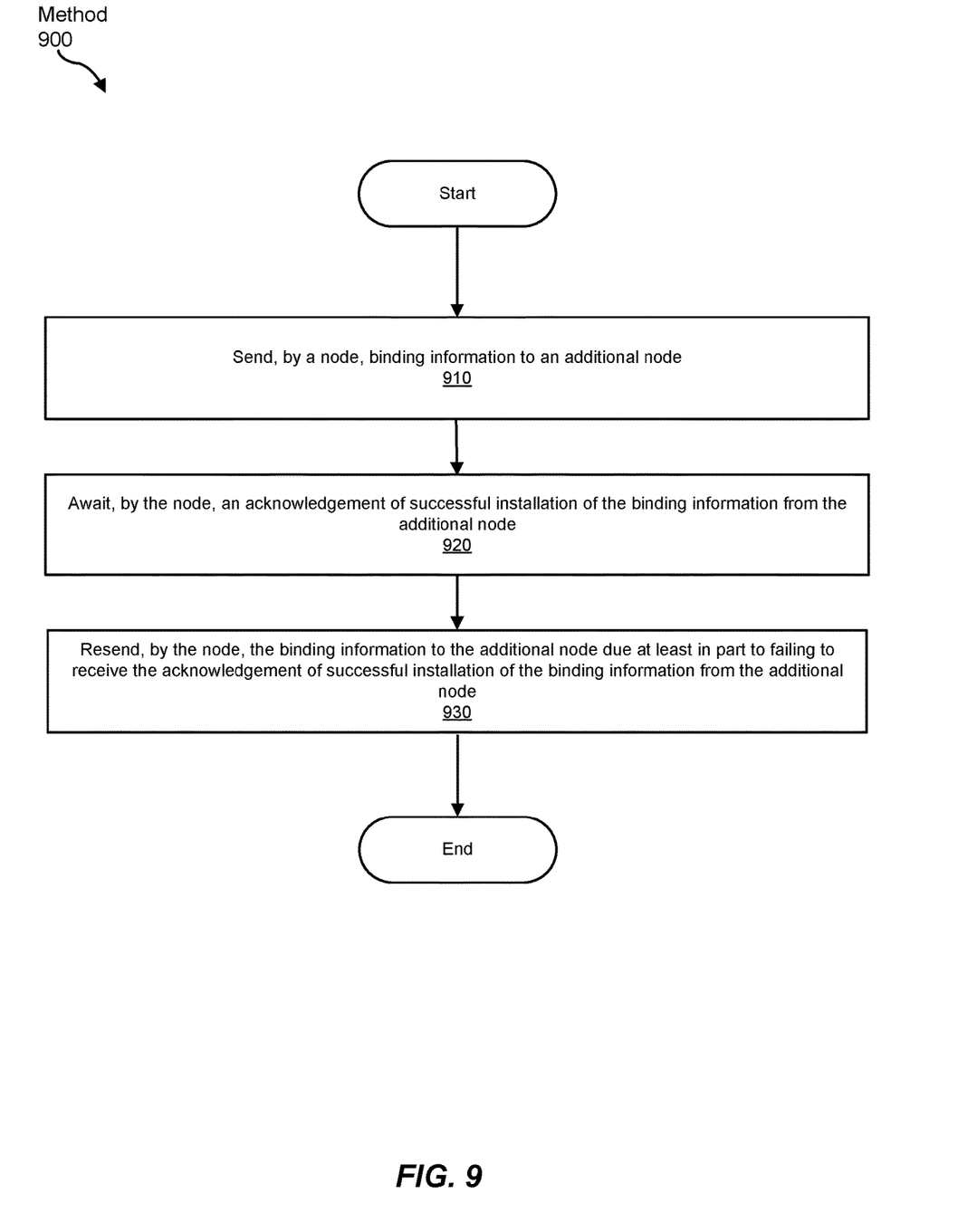
FIG. 9 is a flow diagram of an exemplary method for installing binding information after failures caused by transient errors according to one or more embodiments of this disclosure.

FIG. 9 is a flow diagram of an exemplary method 900 for installing binding information after failures caused by transient errors. In one example, the steps shown in FIG. 9 may be performed by a computing device (e.g., a relay device and/or a server) included in a network. Additionally or alternatively, the steps shown in FIG. 9 may incorporate and/or involve certain sub-steps and/or variations consistent with the descriptions provided above in connection with FIGS. 1-8.

As illustrated in FIG. 9, method 900 may include and/or involve the step of sending, by a node, binding information to an additional node (910). Step 910 may be performed in a variety of ways, including any of those described above in connection with FIGS. 1-8. For example, a node (e.g., a relay device and/or a server) may send binding information to an additional node.

Method 900 may also include and/or involve the step of awaiting, by the node, an acknowledgement of successful installation of the binding information from the additional node (920). Step 920 may be performed in a variety of ways, including any of those described above in connection with FIGS. 1-8. For example, the node may await an acknowledgement of successful installation of the binding information from the additional node.

Method 900 may further include and/or involve the step of resending, by the node, the binding information to the additional node due at least in part to failing to receive the acknowledgement of successful installation of the binding information from the additional node (930). Step 930 may be performed in a variety of ways, including any of those described above in connection with FIGS. 1-8. For example, the node may resending the binding information to the additional node due at least in part to not having received the acknowledgement of successful installation of the binding information from the additional node.

Figure 10:
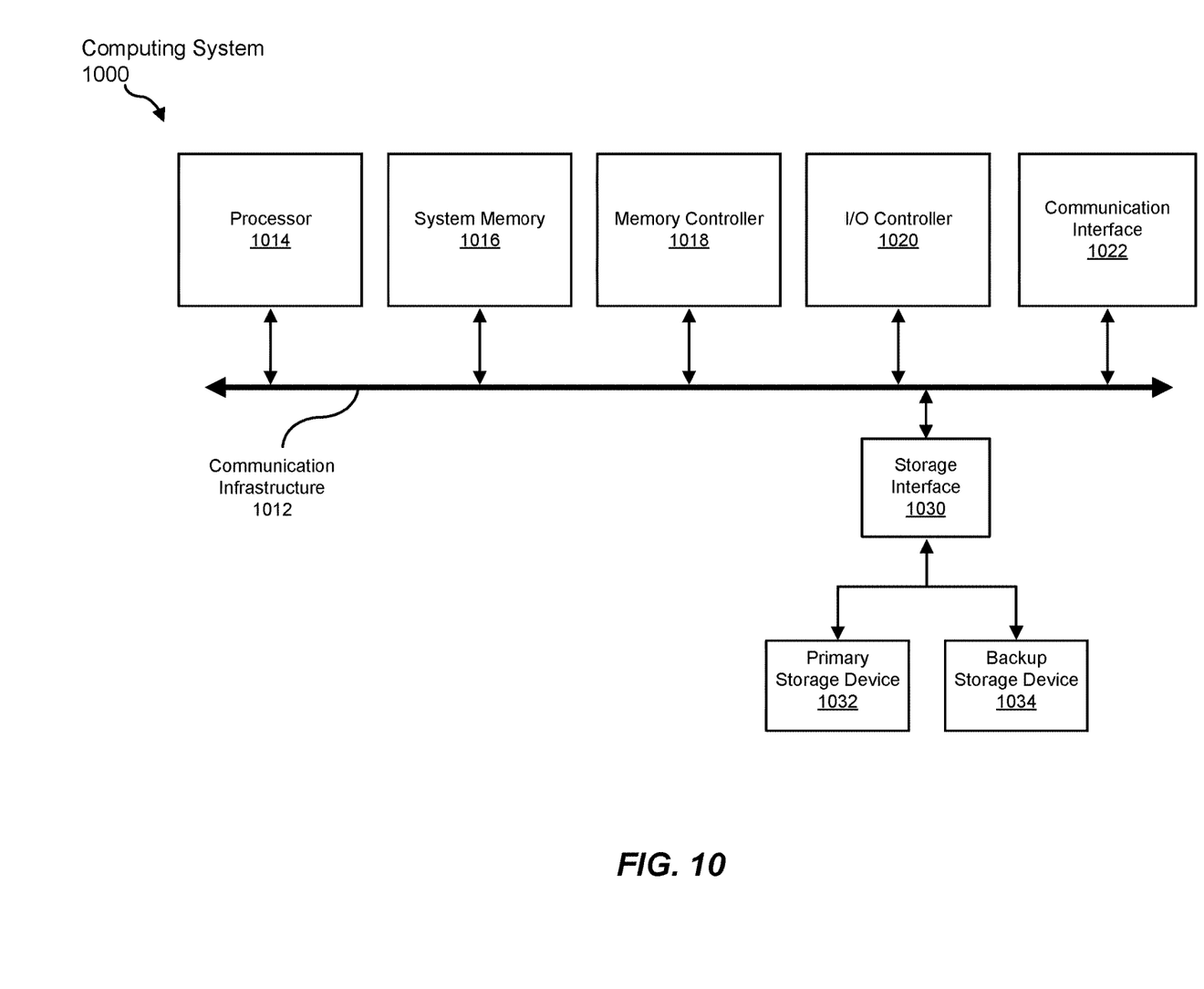
FIG. 10 is a block diagram of an exemplary computing system capable of implementing and/or being used in connection with one or more of the embodiments described in this disclosure.

FIG. 10 is a block diagram of an exemplary computing system 1000 capable of implementing and/or being used in connection with one or more of the embodiments described and/or illustrated herein. In some embodiments, all or a portion of computing system 1000 may perform and/or be a means for performing, either alone or in combination with other elements, one or more of the steps described in connection with FIG. 3. All or a portion of computing system 1000 may also perform and/or be a means for performing and/or implementing any other steps, methods, or processes described and/or illustrated herein.

Computing system 1000 broadly represents any type or form of electrical load, including a single or multi-processor computing device or system capable of executing computer-readable instructions. Examples of computing system 1000 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 1000 may be programmed, configured, and/or otherwise designed to comply with one or more networking protocols. According to certain embodiments, computing system 1000 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 1000 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPOE), a Point-to-Point Protocol over ATM (PPPOA), a Bluetooth protocol, an IEEE 802.XX protocol, a frame relay protocol, a token ring protocol, a spanning tree protocol, and/or any other suitable protocol.

Computing system 1000 may include various network and/or computing components. For example, computing system 1000 may include at least one processor 1014 and a system memory 1016. Processor 1014 generally represents any type or form of processing unit capable of processing data or interpreting and executing instructions. For example, processor 1014 may represent an ASIC, a system on a chip (e.g., a network processor), a hardware accelerator, a general purpose processor, and/or any other suitable processing element.

Processor 1014 may process data according to one or more of the networking protocols discussed above. For example, processor 1014 may execute or implement a portion of a protocol stack, may process packets, may perform memory operations (e.g., queuing packets for later processing), may execute end-user applications, and/or may perform any other processing tasks.

System memory 1016 generally represents any type or form of volatile or non-volatile storage device or medium capable of storing data and/or other computer-readable instructions. Examples of system memory 1016 include, without limitation, Random Access Memory (RAM), Read Only Memory (ROM), flash memory, or any other suitable memory device. Although not required, in certain embodiments computing system 1000 may include both a volatile memory unit (such as, for example, system memory 1016) and a non-volatile storage device (such as, for example, primary storage device 1032, as described in detail below). System memory 1016 may be implemented as shared memory and/or distributed memory in a network device. Furthermore, system memory 1016 may store packets and/or other information used in networking operations.

In certain embodiments, exemplary computing system 1000 may also include one or more components or elements in addition to processor 1014 and system memory 1016. For example, as illustrated in FIG. 10, computing system 1000 may include a memory controller 1018, an Input/Output (I/O) controller 1020, and a communication interface 1022, each of which may be interconnected via communication infrastructure 1012. Communication infrastructure 1012 generally represents any type or form of infrastructure capable of facilitating communication between one or more components of a computing device. Examples of communication infrastructure 1012 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 1018 generally represents any type or form of device capable of handling memory or data or controlling communication between one or more components of computing system 1000. For example, in certain embodiments memory controller 1018 may control communication between processor 1014, system memory 1016, and I/O controller 1020 via communication infrastructure 1012. In some embodiments, memory controller 1018 may include a Direct Memory Access (DMA) unit that may transfer data (e.g., packets) to or from a link adapter.

I/O controller 1020 generally represents any type or form of device or module capable of coordinating and/or controlling the input and output functions of a computing device. For example, in certain embodiments I/O controller 1020 may control or facilitate transfer of data between one or more elements of computing system 1000, such as processor 1014, system memory 1016, communication interface 1022, and storage interface 1030.

Communication interface 1022 broadly represents any type or form of communication device or adapter capable of facilitating communication between exemplary computing system 1000 and one or more additional devices. For example, in certain embodiments communication interface 1022 may facilitate communication between computing system 1000 and a private or public network including additional computing systems. Examples of communication interface 1022 include, without limitation, a link adapter, a wired network interface (such as a network interface card), a wireless network interface (such as a wireless network interface card), and any other suitable interface. In at least one embodiment, communication interface 1022 may provide a direct connection to a remote server via a direct link to a network, such as the Internet. Communication interface 1022 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 1022 may also represent a host adapter configured to facilitate communication between computing system 1000 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1022 may also enable computing system 1000 to engage in distributed or remote computing. For example, communication interface 1022 may receive instructions from a remote device or send instructions to a remote device for execution.

As illustrated in FIG. 10, exemplary computing system 1000 may also include a primary storage device 1032 and/or a backup storage device 1034 coupled to communication infrastructure 1012 via a storage interface 1030. Storage devices 1032 and 1034 generally represent any type or form of storage device or medium capable of storing data and/or other computer-readable instructions. For example, storage devices 1032 and 1034 may represent a magnetic disk drive (e.g., a so-called hard drive), a solid state drive, a floppy disk drive, a magnetic tape drive, an optical disk drive, a flash drive, or the like. Storage interface 1030 generally represents any type or form of interface or device for transferring data between storage devices 1032 and 1034 and other components of computing system 1000.

In certain embodiments, storage devices 1032 and 1034 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1032 and 1034 may also include other similar structures or devices for allowing computer software, data, or other computer-readable instructions to be loaded into computing system 1000. For example, storage devices 1032 and 1034 may be configured to read and write software, data, or other computer-readable information. Storage devices 1032 and 1034 may be a part of computing system 1000 or may be separate devices accessed through other interface systems.

Many other devices or subsystems may be connected to computing system 1000. Conversely, all of the components and devices illustrated in FIG. 10 need not be present to practice the embodiments described and/or illustrated herein. The devices and subsystems referenced above may also be interconnected in different ways from those shown in FIG. 10. Computing system 1000 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of network device 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
   a first node; and
   a second node communicatively coupled to the first node via a network that implements a dynamic host configuration protocol (DHCP), wherein the second node is configured to:
   send, to the first node, DHCP binding information that comprises a mapping of a unique identifier of the first node to an Internet Protocol (IP) address;
   receive a negative acknowledgement of unsuccessful installation of the DHCP binding information from the first node;
   identify, within the negative acknowledgement, data indicating that the first node failed to successfully install the DHCP binding information due at least in part on a transient error, the second node having been programmed to:
      resend the DHCP binding information if the data indicates that the install failed due to the transient error; and
      refuse to resend the DHCP binding information if the data indicates that the install failed due to a permanent error;
   resend the DHCP binding information to the first node due at least in part to the transient error; and
   receive an acknowledgement of successful installation of the DHCP binding information from the first node after resending the DHCP binding information.

2. The system of claim 1, wherein the second node is further configured to:
   receive a lease query from the first node; and
   send the DHCP binding information to the first node in response to receiving the lease query, the DHCP binding information corresponding to the lease query.

3. The system of claim 2, wherein the lease query comprises at least one of:
   an individual lease query; or
   a bulk lease query.

4. The system of claim 2, wherein the first node is configured to:
   receive the DHCP binding information corresponding to the lease query from the second node;
   fail to install the DHCP binding information; and
   in response to the failure to install the DHCP binding information, send the negative acknowledgement of unsuccessful installation of the DHCP binding information to the second node.

5. The system of claim 1, wherein the second node is further configured to:
   determine that the first node was able to successfully install the DHCP binding information based at least in part on the acknowledgement.

6. The system of claim 1, wherein the second node is further configured to:
   determine, based at least in part on the data, that a reason that the first node failed to successfully install the DHCP binding information is the transient error; and
   resend the DHCP binding information to the first node due at least in part to the reason being the transient error.

7. The system of claim 1, wherein the second node is further configured to:
   await the acknowledgement of successful installation of the DHCP binding information from the first node after having sent the DHCP binding information to the first node;
   while awaiting the acknowledgment, detect expiration of a timer that measures an amount of time that has passed since having sent the DHCP binding information to the first node; and
   resend the DHCP binding information to the first node due at least in part to detecting the expiration of the timer.

8. The system of claim 1, wherein the first node or the second node comprises a relay device that communicatively couples a server to a client device.

9. A node comprising:
   a communication interface; and
   a processing device communicatively coupled to the communication interface, wherein the processing device is configured to:
   send, to an additional node via the communication interface, dynamic host configuration protocol (DHCP) binding information that comprises a mapping of a unique identifier of the additional node to an Internet Protocol (IP) address;
   receive a negative acknowledgement of unsuccessful installation of the DHCP binding information from the additional node;
   identify, within the negative acknowledgement, data indicating that the additional node failed to successfully install the DHCP binding information due at least in part on a transient error, the processing device having been programmed to:
      resend the DHCP binding information if the data indicates that the install failed due to the transient error; and
      refuse to resend the DHCP binding information if the data indicates that the install failed due to a permanent error;
   resend the DHCP binding information to the additional node due at least in part to the transient error; and
   receive an acknowledgement of successful installation of the DHCP binding information from the additional node after resending the DHCP binding information.

10. The node of claim 9, wherein the processing device is further configured to:
  receive a lease query from the additional node; and
  send the DHCP binding information to the additional node in response to receiving the lease query, the DHCP binding information corresponding to the lease query.

11. The node of claim 10, wherein the lease query comprises at least one of:
  an individual lease query; or
  a bulk lease query.

12. The node of claim 9, wherein the processing device is further configured to:
  determine that the additional node was able to successfully install the DHCP binding information based at least in part on the acknowledgement.

13. The node of claim 9, wherein the processing device is further configured to:
  determine, based at least in part on the data, that a reason that the additional node failed to successfully install the DHCP binding information is the transient error; and
  resend the DHCP binding information to the additional node due at least in part to the reason being the transient error.

14. The node of claim 9, wherein the processing device is further configured to:
  await the acknowledgement of successful installation of the DHCP binding information from the additional node after having sent the DHCP binding information to the additional node;
  while awaiting the acknowledgment, detect expiration of a timer that measures an amount of time that has passed since having sent the DHCP binding information to additional node; and
  resend the DHCP binding information to the additional node due at least in part to detecting the expiration of the timer.

15. A method comprising:
  sending, by a node to an additional node via a network that implements a dynamic host configuration protocol (DHCP), DHCP binding information that comprises a mapping of a unique identifier of the additional node to an Internet Protocol (IP) address;
  receiving, by the node, a negative acknowledgement of unsuccessful installation of the DHCP binding information from the additional node;
  identifying, within the negative acknowledgement, data indicating that the additional node failed to successfully install the DHCP binding information due at least in part on a transient error, the node being programmed to:
    resend the DHCP binding information if the data indicates that the install failed due to the transient error; and
    refuse to resend the DHCP binding information if the data indicates that the install failed due to a permanent error;
  resending, by the node, the DHCP binding information to the additional node due at least in part to the transient error; and
  receiving, by the node, an acknowledgement of successful installation of the DHCP binding information from the additional node after resending the DHCP binding information.

* * * * *